(12) United States Patent
DeRosa

(10) Patent No.: US 6,510,019 B1
(45) Date of Patent: Jan. 21, 2003

(54) ACCELERATION TRACKING POSITION CONTROLLER

(75) Inventor: Jeffrey V. DeRosa, Burlington, MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/439,232

(22) Filed: Nov. 12, 1999

(51) Int. Cl.[7] ................................................. G11B 5/55
(52) U.S. Cl. ...................... 360/78.06; 318/561; 318/610
(58) Field of Search ............................... 360/78.06, 75, 360/78.04, 78.07, 78.09; 318/561, 610

(56) References Cited

U.S. PATENT DOCUMENTS

| | | | |
|---|---|---|---|
| 3,798,427 A | 3/1974 | Conners | |
| 4,937,689 A | 6/1990 | Seaver et al. | |
| 5,035,301 A | * 7/1991 | Skalski | 187/295 |
| 5,325,247 A | 6/1994 | Ehrlich | |
| 5,379,439 A | * 1/1995 | Harrison et al. | 711/111 |
| 5,469,414 A | * 11/1995 | Okamura | 360/78.06 |
| 5,517,099 A | 5/1996 | Magomedov | |
| 5,519,297 A | 5/1996 | Kono | |
| 5,675,558 A | 10/1997 | Katoh | |
| 5,781,365 A | 7/1998 | Romano | 360/78.06 |
| 5,825,582 A | 10/1998 | Supino | 360/78.06 |
| 5,859,742 A | 1/1999 | Takaishi | 360/78.01 |
| 5,859,743 A | 1/1999 | Kisaka | 360/78.04 |
| 5,936,792 A | * 8/1999 | Kobayashi et al. | 360/78.07 |
| 6,002,544 A | 12/1999 | Yatsu | 360/78.09 |
| 6,055,217 A | 4/2000 | Yanagi | |
| 6,084,742 A | * 7/2000 | Taksishi et al. | 360/78.06 |
| 6,140,791 A | * 10/2000 | Zhang | 318/632 |

FOREIGN PATENT DOCUMENTS

EP 0 263 962 4/1988

* cited by examiner

Primary Examiner—David Hudspeth
Assistant Examiner—James L Habermehl
(74) Attorney, Agent, or Firm—David M. Sigmond (57) ABSTRACT

The invention includes systems and methods for controlling the position of a device. In one aspect, the invention is a method comprising the steps of providing a device, the device having a position, a velocity, and an acceleration; providing a control signal, the position of the device being responsive to the control signal; and varying the control signal, as the device approaches a desired location, according to a nonlinear function of the position, the velocity, and the acceleration wherein the velocity and the acceleration converge on zero as the device approaches the desired position. A number of alternative nonlinear functions may be used. In another aspect, the invention is an apparatus that controls the position of a device according to the nonlinear function described above.

20 Claims, 4 Drawing Sheets

ACCELERATION TRACKING POSITION CONTROLLER

BACKGROUND OF THE INVENTION

1. Field of the Invention

This application relates to the field of position controllers and more particularly to position controllers that track acceleration.

2. Description of Related Art

Position controllers employ a number of electromechanical systems to realize control of a device's position. A typical controller will include sensors to detect the device's current position, an input to receive data concerning the device's desired position, and one or more outputs for control signals that direct the device to the desired location. The control signals are received by actuating elements such as servos, motors, gears, pneumatic pistons, and the like, which convert the control signals into physical motion by the device. The controller also includes a processor that can execute a control algorithm so that the device can be moved to the desired position in some predetermined fashion.

A control algorithm may be as simple as a binary signal that turns on when a detected position is smaller (or larger) than a desired position. More sophisticated controllers employ control algorithms tailored to the requirements of a particular application. Such requirements might include, for example, reaching maximum velocity as quickly as possible. The design of control algorithms draws heavily on control theory, and more specifically o of linear systems. One significant drawback of linear modeling is that it foregoes useful control algorithms that can employ nonlinear combinations of available data to achieve smoother, more rapid convergence on a desired position. Thus, some known control algorithms which aim to achieve rapid movement produce discontinuities in control signals that result in significant electronic noise, or result in oscillation or "ringing" once a desired position is obtained. Further, in order to reduce computational overhead, some control algorithms only use the velocity and the position of a device when establishing levels for control signals.

There remains a need for a position controller that uses a nonlinear control algorithm for which acceleration, velocity, and position all converge continuously on zero. There also remains a need for a nonlinear position controller that tracks device acceleration.

SUMMARY OF THE INVENTION

The invention includes systems and methods for controlling a position of a device. According to the invention, a controller is realized using, as inputs, a device's current acceleration, velocity, and position. The controller uses these inputs in nonlinear combination with a convergence constant to calculate an acceleration-tracking error that can be used to smoothly decelerate the device to a final resting position. The convergence constant is used to control the manner in which this deceleration takes place, e.g., linearly, asymptotically, or instantaneously. The nonlinear combination may be further adapted to limit the maximum slope of the deceleration in the phase plane, i.e., to ensure a maximum, finite bound for the acceleration-tracking error. Alternatively, the controller may switch to other control algorithms when the acceleration-tracking error exceeds a pre-defined limit.

In one aspect, the invention is a method for controlling a position of a device comprising: providing a device, the device having a motion defined by a position, a velocity, and an acceleration; providing a control signal, the position of the device being responsive to the control signal; and varying the control signal, as the device approaches a desired location, according to a nonlinear function of the position, the velocity, and the acceleration wherein the velocity and the acceleration converge on zero as the device approaches the desired position.

Varying the control signal may further comprise determining a convergence constant that defines the manner in which the acceleration converges to zero, and varying the control signal in proportion to the convergence constant. The convergence constant may have a value in a range from one-half to one. Varying the control signal may still further comprise: determining a tracking error, the tracking error calculated by multiplying the convergence constant by the velocity squared and dividing by the position, and subtracting therefrom the acceleration; and varying the control signal according to the tracking error. Varying the control signal may further comprise switching to a linear second-order model when a tracking error exceeds a predetermined limit. Or, varying the control signal may further comprise determining a maximum slope of the motion in a phase plane and limiting the control signal such that the maximum slope is not exceeded. Varying the control signal may still further comprise: determining a tracking error, the tracking error calculated by subtracting the acceleration from a first quantity divided by a second quantity, the first quantity equal to the convergence constant times the square of the velocity, and the second quantity equal to the position minus a third quantity, the third quantity equal to the velocity times a fourth quantity divided by the maximum slope, the fourth quantity equal to one minus the convergence constant; and varying the control signal according to the tracking error.

In one aspect, the device is a disk drive head. In another aspect, the desired position corresponds to an item of computer-readable data. In another aspect, the velocity is directly proportional to a current of the control signal. In another aspect, the position is directly proportional to a voltage of the control signal. In another aspect, the method further comprises periodically receiving a position signal from the device, and calculating the position, the velocity, and the acceleration from the received position signal.

In a different aspect, the invention is a system for controlling a position of a device, the system comprising: a device, the device having a motion defined by a position, a velocity, and an acceleration, the position being responsive to a control signal; and a controller, the controller providing the control signal to the device, the controller further varying the control signal, as the device approaches a desired location, according to a nonlinear function of the position, the velocity, and the acceleration wherein the velocity and the acceleration converge on zero as the device approaches the desired position.

The controller may vary the control signal according to a tracking error, the tracking error being proportional to a convergence constant. The convergence constant may haven a value in a range from one-half to one. In another aspect, the tracking error is calculated by multiplying the convergence constant by the velocity squared and dividing by the position, and subtracting therefrom the acceleration. In another aspect, the controller varies the controller varies the control signal according to a linear second-order model when the tracking error exceeds a predetermined limit. In another aspect, the controller limits the control signal such that a maximum slope of the motion in a phase plane is not exceeded. According to this aspect, the tracking error may calculated by subtracting the acceleration from a first quantity divided by a second quantity, the first quantity equal to the convergence constant times the square of the velocity, and the second quantity equal to the position minus a third quantity, the third quantity equal to the velocity times a fourth quantity divided by the maximum slope, the fourth quantity equal to one minus the convergence constant.

In the system, the device may be a disk drive head. The desired position may correspond to an item of computer-readable data. The velocity may be directly proportional to a current of the control signal. Or, the position may be directly proportional to a voltage of the control signal. The controller may periodically receives a position signal from the device, the controller calculating the position, the velocity, and the acceleration of the device from the received position signal.

In a different aspect, the invention is a position controller comprising: means for determining a position, a velocity, and an acceleration of a device; means for providing a control signal to the device, the control signal controlling the position of the device; and means for varying the control signal, as the device approaches a desired location, according to a nonlinear function of the position, the velocity, and the acceleration wherein the velocity and the acceleration converge on zero as the device approaches the desired position.

The position controller may further comprise means for calculating a tracking error, the tracking error calculated by multiplying a convergence constant by the velocity squared and dividing by the position, and subtracting therefrom the acceleration, and means for applying the tracking error to the control signal varying means. The position controller may further comprise means for calculating a tracking error such that a maximum slope in a phase plane is not exceeded, and means for applying the tracking error to the control signal varying means.

BRIEF DESCRIPTION OF DRAWINGS

The foregoing and other objects and advantages of the invention will be appreciated more fully from the following description thereof, with reference to the accompanying drawings, wherein.

DETAILED DESCRIPTION OF THE PREFERRED EMBODIMENT(S)

To provide an overall understanding of the invention, certain illustrative embodiments will now be described, including a position controller for controlling the position of a disk drive head. However, it will be understood by those of ordinary skill in the art that the methods and systems described herein can be suitably adapted to any position controller that generates control signals based upon received inputs of a desired position of a device and one or more of the current position, the velocity, and the acceleration of the device.

Figure 1:
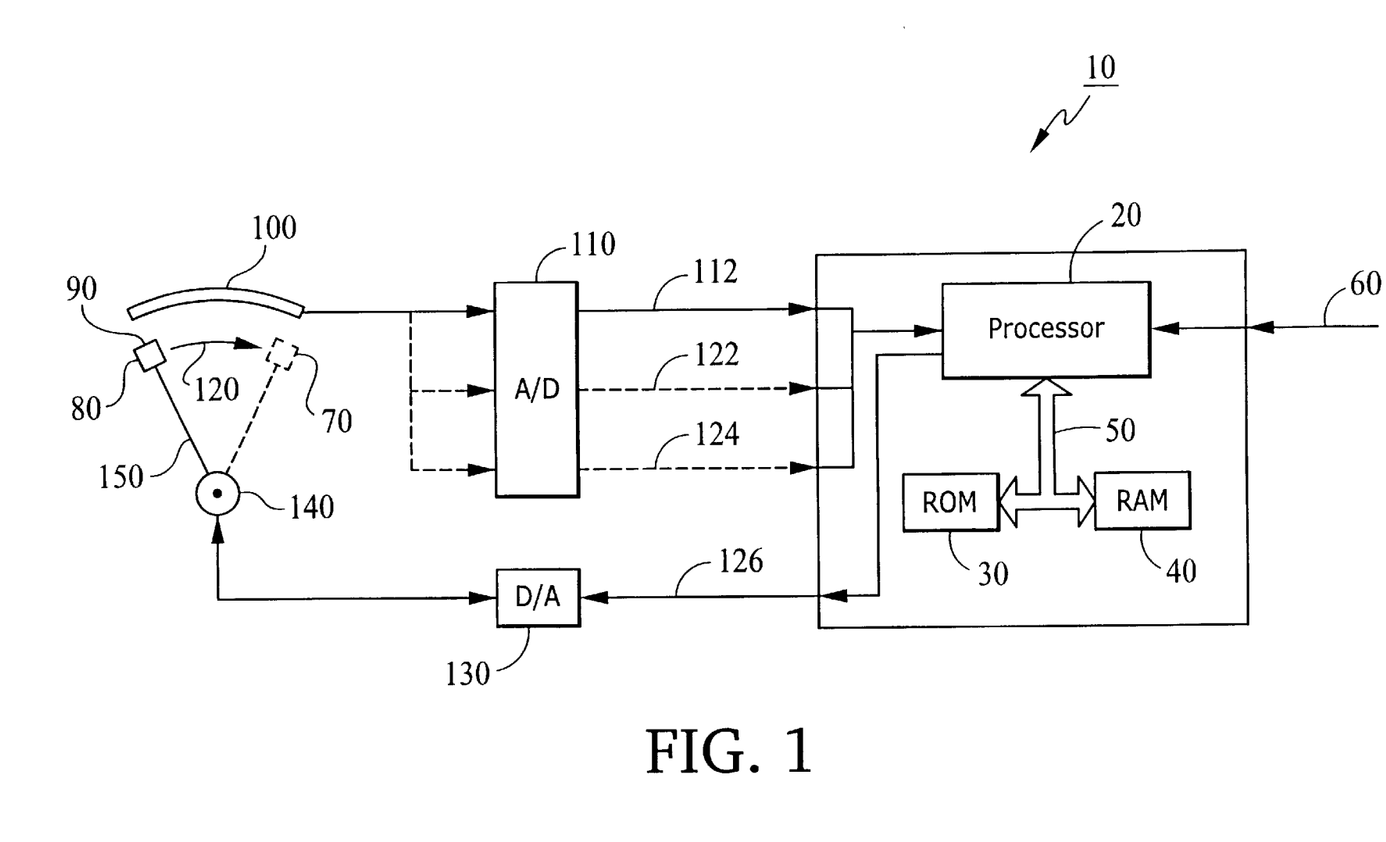
FIG. 1 is a block diagram of an acceleration-tracking position controller according to the invention.

FIG. 1 shows an acceleration-tracking position controller 10 in block diagram form. The controller 10 includes a processor 20, a read-only memory (ROM) 30, and a random-access memory (RAM) 40, interconnected by a bus 50. The processor executes a control algorithm stored in the ROM 30, and stores inputs and temporary data in the RAM 40. The processor receives desired position data as a position input 60 to the controller 10. The position input 60 defines a desired position 70 of a device 80, the device 80 having a current position 90.

The current position 90 of the device 80 is detected by a sensor 100, which may be an optical, electrical, or magnetic sensor capable of determining the current position 90 of the device 80 and converting the current position 90 into an electronic signal which is transmitted to an analog/digital (A/D) converter 110. The A/D converter 110 converts the electronic signal into a digital position signal which is then transmitted to the processor along a position signal line 112. The sensor 100 may optionally or additionally detect a velocity of the device 80, such as the rate at which the device 80 is moving along arrow 120, and convert the velocity into an electronic signal which is transmitted to the A/D converter 110. The A/D converter 110 converts this electronic signal into a digital velocity signal which is transmitted to the processor along a velocity signal line 122. Also, the sensor 100 may optionally or additionally detect an acceleration of the device 80 and convert the acceleration into an electronic signal which is transmitted to the A/D converter 110. The A/D converter 110 converts this electronic signal into a digital acceleration signal which is transmitted to the processor along an acceleration signal line 124. It will be readily apparent that, where acceleration or velocity data is not provided by the sensor 100, the processor may readily determine the velocity and acceleration of the device using historical position data and a known sampling rate.

In operation, the processor 20 receives a position input 60 and the digital position signal on the position signal line 112. The processor 20 executes a position control algorithm resulting in one or more position control signals which are provided to a digital/analog (D/A) converter 130 along a position control line 126. The D/A converter 130 converts the position control signal into a current which causes a servo 140 to rotate at a velocity proportional to the current. A servo arm 150 translates the angular rotation of the servo 140 into circular movement by the device 80. The processor 20 monitors movement of the device 80 through the sensor 100 and, through the control algorithm, makes adjustments to the control signal in order to effectuate a desired movement pattern.

According to the invention, the control algorithm employs a nonlinear mathematical model that ensures that the acceleration and the velocity of the device 80 converge on zero at the same time that the device 80 converges on the desired position 70. The mathematical model is based upon an acceleration-tracking error equation that defines the difference between the present acceleration and the desired acceleration for a particular type of convergence (i.e., linear, asymptotic, etc.). The error equation may be derived by assuming a continuous acceleration defined as a function of time by:

$$A(t) = A_0 - mt^n \quad \text{[Eq. 1]}$$

where:

$A_0$ is the acceleration at t=0;

m is an arbitrary constant;

t is time; and n is a constant establishing how the acceleration converges to zero.

Equation 1 may be integrated twice to recast the equation into velocity and position as functions of time:

$$V(t) = A_0 t \frac{m t^{n+1}}{n+1} + V_0 \qquad [\text{Eq. 2}]$$

$$X(t) = A_0 \frac{t^2}{2} - \frac{m t^{n+2}}{(n+1)(n+2)} + V_0 t + X_0 \qquad [\text{Eq. 3}]$$

where:

$V_0$ is the velocity at t=0; and $X_0$ is the position at t=0.

By solving the expressions for A(t), V(t), and X(t) simultaneously for zero, an error expression is derived that guarantees that the velocity and the acceleration will approach zero along with the distance from the desired position. This yields the relationship:

$$E(t) = G(n) \frac{V^2(t)}{X(t)} - A(t) \qquad [\text{Eq. 4}]$$

which defines an acceleration-tracking error equal to the difference between the present acceleration and the acceleration desired for convergence on zero.

In Eq. 4, G(n) is a convergence constant defined by the relationship:

$$G(n) = \frac{(n+1)^2}{(2n(n+2))} \qquad [\text{Eq. 5}]$$

This expression for G(n) describes the manner in which the acceleration-tracking error converges to zero, based upon the selection of a value for n. Generally, as n approaches infinity, G(n) approaches ½, and the tracking error converges to zero instantaneously. This behavior may be obtained from a conventional linear, second-order model. At n=1, or G(n)=⅔, the tracking error approaches zero linearly. At G(n)=1, the tracking error approaches zero asymptotically. When the acceleration-tracking error is zero, the device position is moving in a straight line toward the origin in a phase plane, as described in more detail below.

Figure 2:
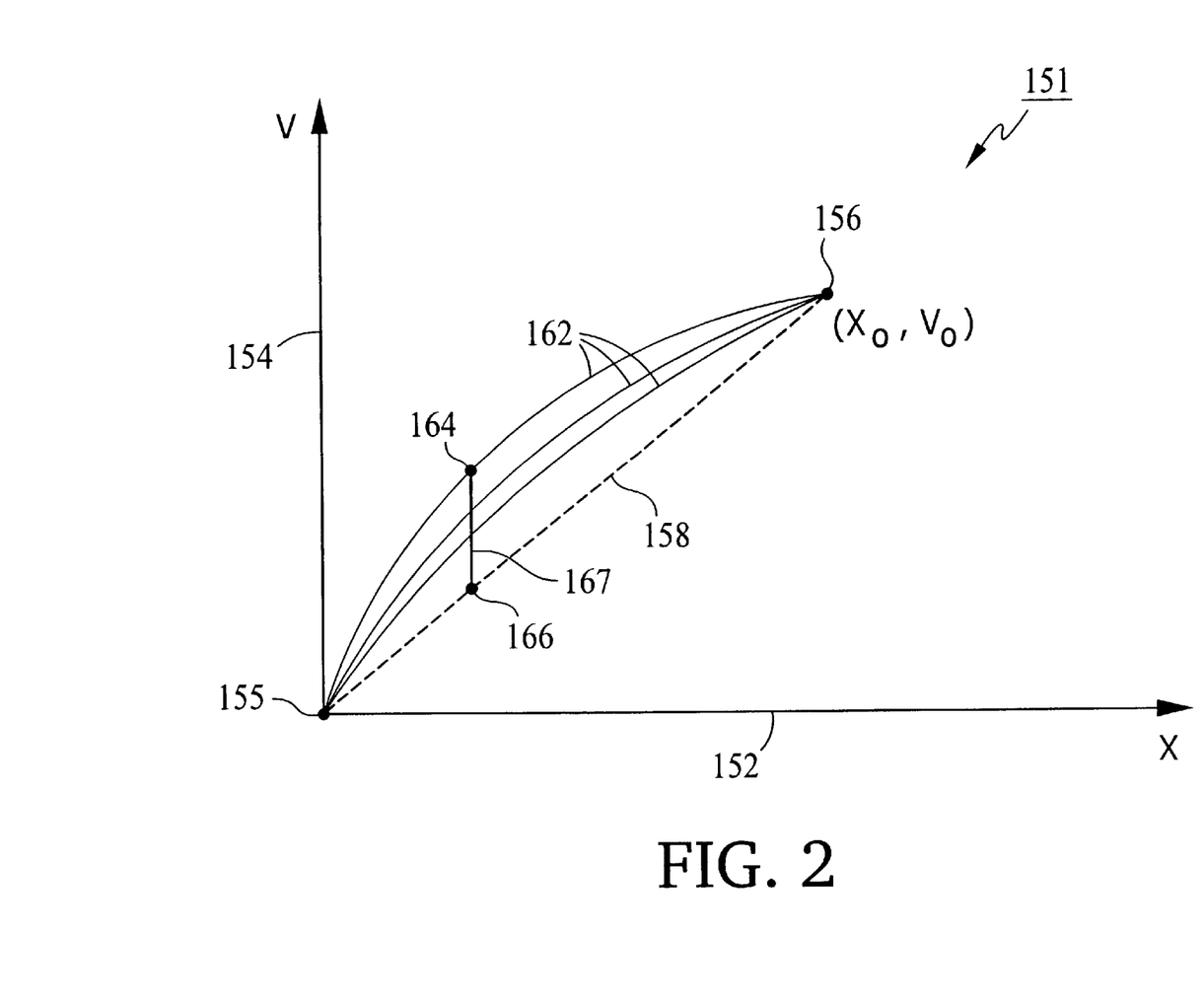
FIG. 2 is a phase plane representation of a device position and velocity.

FIG. 2 is a phase plane representation 151 of a device position and velocity. A device position is represented by a horizontal axis 152, and a device velocity is represented by a vertical axis 154. An origin 155 represents zero velocity, and zero distance from a desired position. A current device position is represented by a point 156 in the phase plane 151. A straight line path 158 represents convergence on the origin 155 according to a prior art second-order control algorithm. Other converging paths 162 are defined according to the acceleration-tracking error, with each value of G(n) defining a different one of the paths 162. For a given position 164 along the horizontal axis 152 (i.e., distance from a final position), it is seen that the velocity is greater than the velocity for a corresponding point 166 along the straight line path 158 of a second-order system, as shown by a vertical line 167. In simpler terms, the device smoothly approaches rest, although it consistently maintains a higher approach velocity than is obtained using a linear, second-order model.

It is noted that the error at any given time can be represented as a function of the current acceleration, velocity, and position, which reduces computational complexity and memory demands in implementations of the control algorithm. It should also be noted that the above relationship describes deceleration to a final position, and not to the acceleration from a starting position. One skilled in the art will appreciate that certain adaptions may be made to apply the above principles to acceleration from an initial velocity of zero. It will further be appreciated that a position controller may, consistent with the present invention, use an entirely different approach to accelerate a device from rest.

Some implementations of the above controller 10 present additional difficulties, since the acceleration-tracking error defined by Eq. 4 may approach infinity as the position approaches zero. One way to address this difficulty is to change the value of G(n) as the position approaches zero, or to switch to the straight-line convergence technique when either: (1) the position is within a certain, pre-determined distance from the origin 155, or (2) the acceleration-tracking error defined by Eq. 4 is greater than a predetermined value. Such a control algorithm will still benefit from more rapid convergence for at least a portion of the device deceleration. It will be appreciated that a pre-determined value for the acceleration-tracking error will be determined according to system constraints, such as arithmetic overflow in the processor 20, or physical limits on the control signals from the D/A converter 130.

Another approach is to apply an acceleration-tracking error that is constrained to a maximum slope, M, in the phase plane 151. This constraint may be stated mathematically as:

$$\lim_{x \to 0} \frac{dv}{dx} = M \qquad [\text{Eq. 6}]$$

The desired relationship for the acceleration-tracking error may be obtained by assuming a continuous velocity of the following form:

$$V(x) = C \cdot \left( X - \frac{V(x)}{M} \right)^G \qquad [\text{Eq. 7}]$$

where:

V(x) is the velocity as a function of position;

X is the current position;

C is an arbitrary constant;

G is a constant determining the nature of convergence; and

M is the maximum slope of the deceleration curve in the phase plane.

Using Eq. 7, an expression for the acceleration-tracking error may be derived:

$$E(t) = \frac{G \cdot V^2(t)}{\left( X(t) - \frac{1-G}{M} \cdot V(t) \right)} - A(t) \qquad [\text{Eq. 8}]$$

As with Eq. 4, this relationship may be implemented in a controller using instantaneous values for acceleration, velocity, and position.

Figure 3:
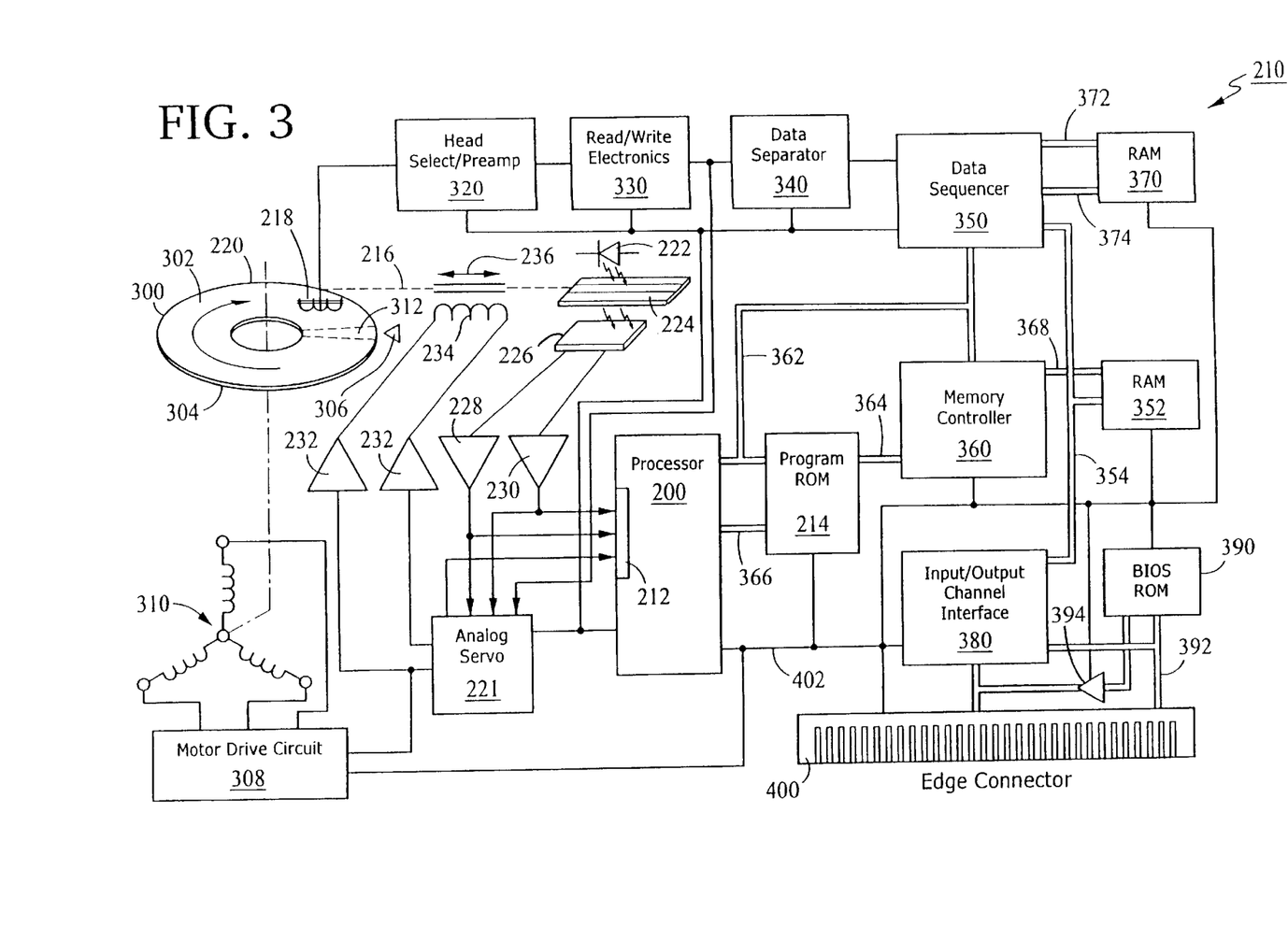
FIG. 3 is a block diagram of a disk drive head acceleration-tracking position controller according to the invention.

FIG. 3 is a block diagram of a disk drive head acceleration-tracking position controller according to the present invention. A processor 200 provides position control in a disk drive storage system 210. The disk drive storage system might be used with a host computer such as a conventional personal computer, or some other host system requiring non-volatile storage of data. The processor 200 includes a central processing unit (CPU), an arithmetic logic unit (ALU), and other internal supporting architecture to execute instructions.

The processor has an internal A/D converter 212 that periodically converts the voltage appearing at a selected input into a digital value which may be read by the processor 200 under program control. The processor 200 also includes an internal RAM, timers, event counters, serial and parallel interfaces and input/output ports. If the processor 200 is a microcontroller, then program code may be stored directly in the microcontroller chip; however, if the processor 200 is a microprocessor, then the processor 200 also requires external program memory for storing the instructions which it is to execute in carrying out the supervisory functions of the control system.

A read-only program memory 214 is connected to the processor 200, and it contains the instructions which the processor 200 will execute during operation of the disk drive storage system 210. The processor 200 executes the program stored in the read-only memory 214 to control radial head position via an actuator 216, which may be an electromagnetic voice coil actuator, and to respond to commands from a host computer system (not shown) by initiating and monitoring transfers of blocks of data. The processor 200, through the actuator 216, maintains a head 218 at a correct position to read or write data from a disk 220.

An analog/digital servo circuit 221 is connected to the processor 200, and the servo circuit 221 provides circuit elements which are required to carry out functions in data track seeking and track following operations of the head 218. An optical circuit comprising an LED light source 222, a mask 224 and a photocell 226 is used to generate signals to a first operation amplifier 228 and a second operational amplifier 230. The operational amplifiers 228, 230 are configured as current-to-voltage converters, and provide voltage signals indicative of the position of the head 218 to the A/D converter 212 of the processor 200, and to the servo circuit 221.

The servo circuit 221 converts digital position values to driving currents and applies these currents through driving circuitry 232 to a winding 234 of the actuator 216. The actuator 216 moves in the direction of a bold arrow 236 in response to currents in the winding 234. The actuator 216 is coupled on one hand to the head 218, thus effectuating head movement, and on the other hand to the mask 224, where movement of the actuator 216 is converted into electrical signals which can be tracked by the processor 200.

Data is stored on a disk 300 having an upper data storage surface 302 and a lower data storage surface 304, each coated with a suitable magnetic data storage material. Each data storage surface 302, 304 provides storage room for a multiplicity of concentric data storage tracks, there being a number of logical tracks available on each data surface 302, 304. It will be appreciated that a number of co-axial disks and a number of heads may additionally be provided within a single disk drive storage system 210. An index marker 306, generated by motor driver circuitry 308 controlling a spindle motor 310, marks a location in time for a narrow, predetermined width, single servo sector 312 prerecorded with track centerline information for each data track on the data storage surfaces 302, 304 of the disk 300. This information is used to more accurately align the head 218 for reading and writing operations.

The disk drive storage system 210 includes a head select and pre-amplification circuit 320 which includes circuitry to select among multiple heads under control of the processor 200, and circuitry to amplify data signals detected on the disk 300. A read/write circuit 330 operates under control of the processor 200 to control the selection between reading from and writing to the disk 300. A data separator 340, operating under control of the processor 200, encodes and decodes data between internal (disk) and external (computer memory) representations. A data sequencer 350 also operates under control of the processor 200 to provide addressing information corresponding to a physical configuration of the disk 300, and further to provide serial/parallel conversion and error detection/correction for disk drive data.

Data to and from the data sequencer 350 is buffered in a buffer RAM 352 via a data bus 354, under control of a memory controller 360. The memory controller 360 provides addressing information for the buffer RAM 352, and further coordinates memory access between the read-only program memory 214 and the processor 200 through an address/data bus 362. The processor 200 can access the read-only program memory 214 through the memory controller 360 through a program memory address bus 364 and a program memory data bus 366. The buffer RAM 352 has a buffer address bus 368 for direct memory access control by the memory controller 360.

The data sequencer 350 may also have a dedicated RAM 370 accessible by a sequencer address bus 372 and a sequencer data bus 374, for temporary storage of data not intended for transfer to or from an input/output interface 380 of the disk drive storage system 210.

The disk drive storage system 210 may optionally include a basic input/output system (BIOS) ROM 390 that includes a collection of error and status condition routines which can be used by an operating system of a host or other device accessing the system 210 through the interface 380. The BIOS ROM 390 includes a BIOS bus 392 that receives data from an external system and a BIOS driver 394 for driving electronic signals out of the disk drive storage system 210.

The disk drive storage system 210 includes an edge connector 400 that is mechanically and electrically compatible with a connector or bus (not shown) from a system to which the disk drive storage system 210 is connected. Other signals may be required to synchronize and control various circuits of the disk drive storage system 210, as shown generally by a control bus 402.

A disk drive storage system like that shown in FIG. 3 is described in further detail in U.S. Pat. No. 5,379,439, the teachings of which are incorporated herein by reference. The disk drive storage system 210 may be programmed by loading a desired control program into the read-only program memory 214.

Figure 4:
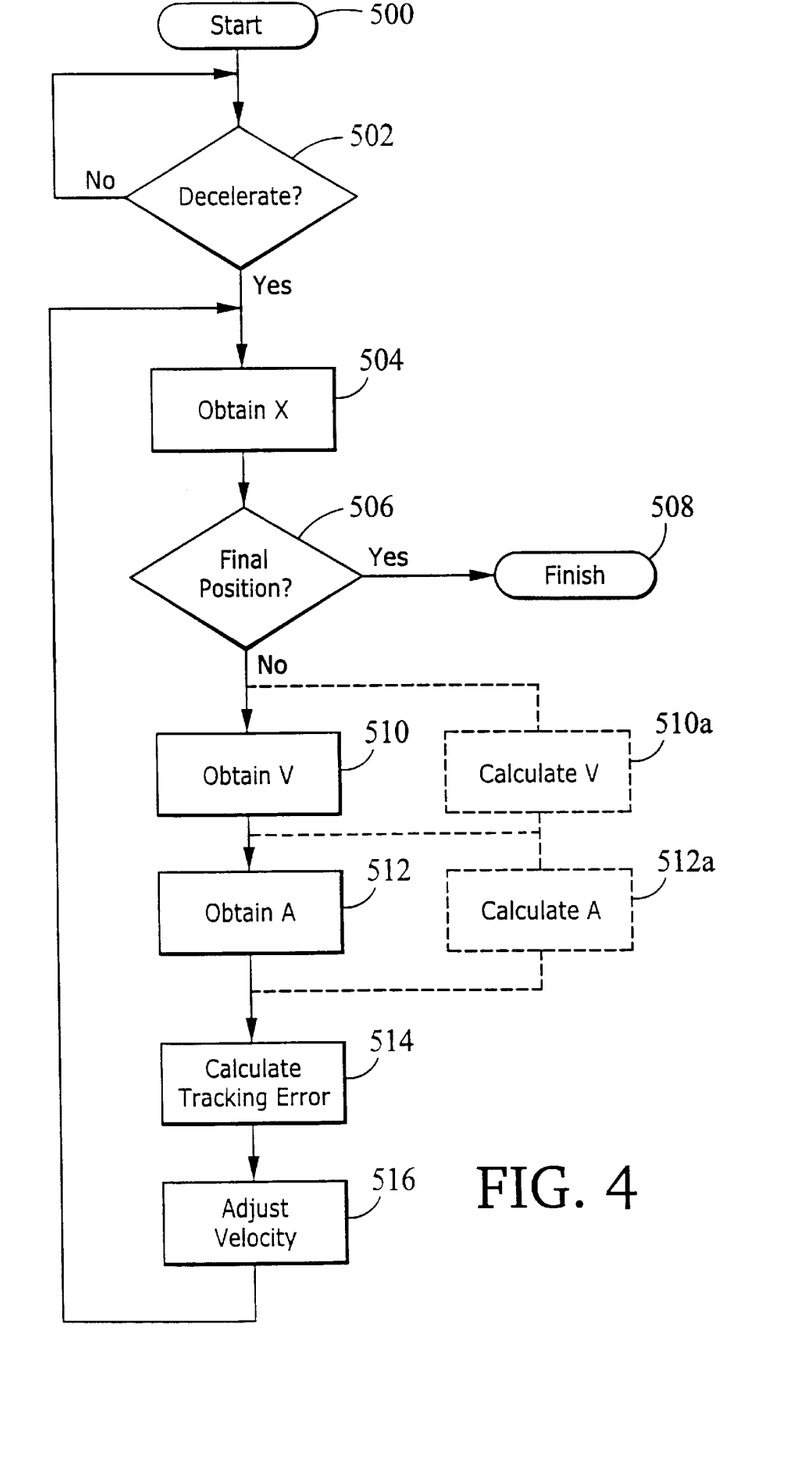
FIG. 4 is a flow chart of a control algorithm for an acceleration-tracking position controller according to the invention

FIG. 4 is a flow chart detailing a control algorithm for an acceleration-tracking position controller according to the invention. The steps detailed in FIG. 4 may be transformed into computer executable steps for use with the processor 200 of the disk drive storage system 210.

The control algorithm starts 500 with a step of determining whether to begin deceleration of a controlled position 502. The procedure will not be invoked to adjust velocity until the current position, X, is within a predetermined distance from a final position. Thus, if the current position, X, is not within the predetermined distance, the step 502 is repeated. This continues until the current position, X, is within the predetermined distance.

When the current position, X, is within the predetermined distance, a value is obtained for the current position, X, as shown in step 504.

In step 506, it is determined whether the current position is the final position desired. If the current position is the final position, then the procedure finishes as shown in step 508. If the current position is not the final position, then the procedure passes to step 510 where a velocity, V, is obtained.

Where a velocity, V, is not directly available from a transducer or other device, the velocity, V, may optionally be calculated, as shown in step 510*a*. Typically, this would be a linear estimate of an instantaneous velocity based upon a difference between the current position, X, and a previous position using a simple rate formula.

In step 512, an acceleration is determined. As with velocity, this may be measured directly by an appropriate transducer, or optionally calculated as shown in step 512*a*. The calculated acceleration would typically by a linear estimate of an instantaneous acceleration based upon the difference between the current velocity and a previous velocity.

In step 514, an acceleration-tracking error is calculated. The error is calculated by applying Eq. 4 or Eq. 8 above to the instantaneous position, velocity, and acceleration from steps 504–512, along with a selected value for G. The instantaneous position used for this calculation is the distance from a desired final position, as expected from the initial goal of convergence on zero.

As noted above, when applying Eq. 4 in step 514, certain systems will not respond well to values for the position, X, close to zero, due to physical or calculation limits. In these cases, step 514 will include several sub-steps. First, a limit must be selected for the position, X, or for the acceleration-tracking error. Second, when the limit is exceeded, an alternative deceleration algorithm must be applied. The alternative deceleration algorithm may use a second-order linear model, including a simple linear combination of velocity and position. Or instead, a new value for G(n), or n, may be chosen such that the calculated acceleration-tracking error is within desired limits.

In step 516, the velocity is adjusted in an amount corresponding to the acceleration-tracking error, and the procedure returns to step 504 to obtain a new value for the position, X. In the disk drive storage system 210 depicted in FIG. 3, the error calculated in step 514 will be adjusted by a suitable constant to scale the error in a manner fitting to the servo circuitry 221 and actuator 216.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for controlling a position of a device comprising:
   providing a device, the device having a motion defined by a position, a velocity, and an acceleration;
   providing a control signal, the position of the device being responsive to the control signal; and
   varying the control signal, as the device approaches a desired location, according to a nonlinear function of the position, the velocity, and the acceleration wherein the velocity and the acceleration converge on zero as the device approaches the desired position, and wherein varying the control signal further comprises:
      determining a convergence constant that defines the manner in which the acceleration converges to zero,
      varying the control signal in proportion to the convergence constant,
      determining a tracking error, the tracking error calculated by multiplying the convergence constant by the velocity squared and dividing by the position, and subtracting therefrom the acceleration, and
      varying the control signal according to the tracking error.

2. A method for controlling a position of a device comprising:
   providing a device, the device having a motion defined by a position, a velocity, and an acceleration;
   providing a control signal, the position of the device being responsive to the control signal; and
   varying the control signal, as the device approaches a desired location, according to a nonlinear function of the position, the velocity, and the acceleration wherein the velocity and the acceleration converge on zero as the device approaches the desired position, and wherein varying the control signal further comprises:
      determining a convergence constant that defines the manner in which the acceleration converges to zero,
      varying the control signal in proportion to the convergence constant, and
      switching to a linear second-order model when a tracking error exceeds a predetermined limit.

3. A method for controlling a position of a device comprising:
   providing a device, the device having a motion defined by a position, a velocity, and an acceleration;
   providing a control signal, the position of the device being responsive to the control signal; and
   varying the control signal, as the device approaches a desired location, according to a nonlinear function of the position, the velocity, and the acceleration wherein the velocity and the acceleration converge on zero as the device approaches the desired position, and wherein varying the control signal further comprises:
      determining a convergence constant that defines the manner in which the acceleration converges to zero,
      varying the control signal in proportion to the convergence constant,
      determining a maximum slope of the motion in a phase plane and limiting the control signal such that the maximum slope is not exceeded,
      determining a tracking error, the tracking error calculated by subtracting the acceleration from a first quantity divided by a second quantity, the first quantity equal to the convergence constant times the square of the velocity, and the second quantity equal to the position minus a third quantity, the third quantity equal to the velocity times a fourth quantity divided by the maximum slope, the fourth quantity equal to one minus the convergence constant, and
      varying the control signal according to the tracking error.

4. The method of claims 1, 2 or 3 wherein the convergence constant has a value in a range from one-half to one.

5. The method of claims 1 or 2 wherein varying the control signal further comprises determining a maximum slope of the motion in a phase plane and limiting the control signal such that the maximum slope is not exceeded.

6. The method of claims 1, 2 or 3 wherein the device is a disk drive head.

7. The method of claims 1, 2 or 3 wherein the desired position corresponds to an item of computer-readable data.

8. The method of claims 1, 2 or 3 wherein the velocity is directly proportional to a current of the control signal.

9. The method of claims 1, or 7 further comprising periodically receiving a position signal from the device, and calculating the position, the velocity, and the acceleration from the received position signal.

10. A system for controlling a position of a device, the system comprising:

a device, the device having a motion defined by a position, a velocity, and an acceleration, the position being responsive to a control signal; and a controller, the controller providing the control signal to the device, the controller further varying the control signal, as the device approaches a desired location, according to a nonlinear function of the position, the velocity, and the acceleration wherein the velocity and the acceleration converge on zero as the device approaches the desired position, the controller varying the control signal according to a tracking error, the tracking error being proportional to a convergence constant, wherein the tracking error is calculated by multiplying the convergence constant by the velocity squared and dividing by the position, and subtracting therefrom the acceleration.

11. A system for controlling a position of a device, the system comprising:

a device, the device having a motion defined by a position, a velocity, and an acceleration, the position being responsive to a control signal; and a controller, the controller providing the control signal to the device, the controller further varying the control signal, as the device approaches a desired location, according to a nonlinear function of the position, the velocity, and the acceleration wherein the velocity and the acceleration converge on zero as the device approaches the desired position, the controller varying the control signal according to a tracking error, the tracking error being proportional to a convergence constant, wherein the controller varies the control signal according to a linear second-order model when the tracking error exceeds a predetermined limit.

12. A system for controlling a position of a device, the system comprising:

a device, the device having a motion defined by a position, a velocity, and an acceleration, the position being responsive to a control signal; and a controller, the controller providing the control signal to the device, the controller further varying the control signal, as the device approaches a desired location, according to a nonlinear function of the position, the velocity, and the acceleration wherein the velocity and the acceleration converge on zero as the device approaches the desired position, the controller varying the control signal according to a tracking error, the tracking error being proportional to a convergence constant, wherein the controller limits the control signal such that a maximum slope of the motion in a phase plane is not exceeded, and the tracking error is calculated by subtracting the acceleration from a first quantity divided by a second quantity, the first quantity equal to the convergence constant times the square of the velocity, and the second quantity equal to the position minus a third quantity, the third quantity equal to the velocity times a fourth quantity divided by the maximum slope, the fourth quantity equal to one minus the convergence constant.

13. The system of claims 10, 11 or 12 wherein the convergence constant has a value in a range from one-half to one.

14. The system of claims 10 or 11 wherein the controller limits the control signal such that a maximum slope of the motion in a phase plane is not exceeded.

15. The system of claims 10, 11 or 12 wherein the device is a disk drive head.

16. The system of claims 10, 11 or 12 wherein the desired position corresponds to an item of computer-readable data.

17. The system of claims 10, 11 or 12 wherein the velocity is directly proportional to a current of the control signal.

18. The system of claims 10, 11 or 12 wherein the controller periodically receives a position signal from the device, the controller calculating the position, the velocity, and the acceleration of the device from the received position signal.

19. A position controller comprising:

means for determining a position, a velocity, and an acceleration of a device;

means for providing a control signal to the device, the control signal controlling the position of the device;

means for varying the control signal, as the device approaches a desired location, according to a nonlinear function of the position, the velocity, and the acceleration wherein the velocity and the acceleration converge on zero as the device approaches the desired position;

means for calculating a tracking error, the tracking error calculated by multiplying a convergence constant by the velocity squared and dividing by the position, and subtracting therefrom the acceleration; and means for applying the tracking error to the control signal varying means.

20. The position controller of claim 19 further comprising means for calculating a tracking error such that a maximum slope in a phase plane is not exceeded, and means for applying the tracking error to the control signal varying means.

* * * * *